United States Patent [19]

Hayashi et al.

[11] Patent Number: 4,684,563

[45] Date of Patent: Aug. 4, 1987

[54] ELECTROTHERMAL TRANSFER RECORDING SHEET

[75] Inventors: Seiichi Hayashi; Katsumori Takei; Yoshitaka Yamaguchi, all of Suwa, Japan

[73] Assignee: Seiko Epson Kabushiki Kaisha, Tokyo, Japan

[21] Appl. No.: 744,095

[22] PCT Filed: Oct. 4, 1984

[86] PCT No.: PCT/JP84/00469

§ 371 Date: May 31, 1985

§ 102(e) Date: May 31, 1985

[30] Foreign Application Priority Data

Oct. 4, 1983 [JP] Japan ................................ 58-185562

[51] Int. Cl.$^4$ .......................... B32B 5/16; B32B 27/06

[52] U.S. Cl. .................................... 428/207; 427/262; 428/337; 428/423.1; 428/423.7; 428/488.4; 428/913

[58] Field of Search ............... 428/195, 206, 207, 913, 428/488.4, 423.7, 423.1, 337; 427/262

[56] References Cited

U.S. PATENT DOCUMENTS

| | | | |
|---|---|---|---|
| 4,100,087 | 7/1978 | Takayama et al. | 430/106.6 |
| 4,479,997 | 10/1984 | Masterson et al. | 428/206 X |
| 4,510,206 | 4/1985 | Shuman | 428/195 X |
| 4,554,562 | 11/1985 | Afzali-Ardakani et al. | 428/206 X |

*Primary Examiner*—Thomas J. Herbert
*Attorney, Agent, or Firm*—Blum Kaplan

[57] ABSTRACT

In an electrothermal transfer system which uses a sheet formed by integrally binding at least a resistive layer and an ink layer and effects desired transfer by flowing electric current through the resistive layer thereby causing the resistive layer to generate joulean heat and enabling the ink layer to be partially fused to be transferred, an electrothermal transfer recording sheet has the resistive layer formed by application of a mixture of carbon black with a resin binder. The carbon black used herein is possessed of a DBP oil absorption capacity of not less than 300 ml/100 g. Thus, the carbon black content in the resistive layer can be as small as 5 to 35% by weight, the tight adhesiveness of the resistive layer improved, and the power consumption lowered.

15 Claims, 2 Drawing Figures

ELECTROTHERMAL TRANSFER RECORDING SHEET

FIELD OF THE INVENTION

This invention relates to an electrothermal transfer recording sheet having at least an ink layer and a resistance layer integrally bound so that the ink layer is melted to be transferred to a given substrate by virtue of joulean heat generated by flow of electric current through the resistive layer.

BACKGROUND OF THE INVENTION

In recent years, the thermal transfer recording has come to draw attention in numerous fields specializing in facsimile devices, computer terminal devices, and recorders because it possesses numerous features including freedom from impact and noise, necessity for no maintenance, low cost, feasibility of reduction in size and weight, and adaptability to color recording. Among other methods, the method which effects electrothermal transfer by the use of a current-passing head suits a full-color recording containing intermediate gradation and deserves the keenest attention as a most promising approach to production of hard copies.

FIG. 1 is a diagram of operating principle illustrating passage of electric current through an electrothermal transfer recording sheet 1 by the use of a recording electrode 5 and a returning electrode 6. In this arrangement, thermal transfer recording on a given blank sheet for recording (not shown) is accomplished by pressing the recording head into contact with a resistive layer 2 of the recording sheet thereby starting flow of current therethrough and causing the resistive layer to generate and assumulate heat until an elevated temperature, and causing a support layer 3 to conduct heat to the ink layer 4 thereby enabling the ink layer 4 to be heated, melted, and made to flow.

The most important quality which the resistive layer in the electrothermal transfer recording sheet is expected to possess is such as to fulfil the requirements (1) that the magnitude of resistance should be lowered to about $10^2$ to $5\times10^5$ ohms, (2) that the resistive layer should be given an ability to withstand heat above at least 300° C. for a brief period, and (3) that the tight adhesion of the resistive layer to the support layer should be enough against the shear friction due to the forced contact made by the curring-passing head.

The resistive layers so far proposed invariably fall short of fulfilling these requirements.

Various devices which have been heretofore contemplated to fulfil these requirements will be described below.

The first problem concerns a reduction in the magnitude of resistance. In this case, for the resistive layer to generate heat by the flow of electric current therethrough, the magnitude of resistance offered by the resistive layer is required to an intermediate between the magnitudes of resistance offered by an insulating material and a good conductor. The magnitude of resistance is fixed by the balance of various factors such as the amount of power supplied, the thermal conductivity of the recording sheet, and the energy spent in melting the ink layer. As means to impart the resistive layer an ability to generate heat, a method which forms a resistive layer by dispersing powder of aluminum, copper, iron, tin, zinc, nickel, molybdenum, or silver as electroconductive particles in a resin binder, a method which effects the production of a resistive layer by dispersion of precipitated copper in a resin binder, a method which produces a resistive layer by dispersing zinc oxide or titanium dioxide in a resin binder, a method which obtains a resistive layer by applying an electroconductive polymer on a substrate layer, and a method which prepares a resistive layer by dispersing graphite or acetylene black in a resin binder have been proposed.

The inventors have studied all these methods. They have consequently found that relatively inexpensive electroconductive particles which exhibit high affinity for the resin binder enough to be uniformly dispersed in the form of finely divided particles within the binder and also exhibit high affinity for the solvent used in solving the binder resin and, therefore, are satisfactorily dispersed in the solvent are carbon type particles such as graphite and acetylene black. The carbon type particles include carbon black besides the aforementioned graphite. By the method of manufacture, the carbon black is divided under the furnace type, the channel type, and the thermal type. It also comes in numerous grades having varying particle properties. In all the carbon type particles available at all, graphite and acetylene black are excellent in electroconductivity. They are extensively utilized, as blended with polymers, in panel heaters, antistatic members, panel switches, and packaging materials.

The magnitude of voltage applied on the current-passing head can be decreased and, consequently, the capacities of the power source and the driving system for the head can be reduced and the electrothermal transfer device can be improved in reliability and economy in proportion as the magnitude of resistance offered by the resistive layer of the electrothermal transfer device is decreased. The magnitude of surface resistance offered by the resistive layer of 2 to 5 $\mu$m in thickness is desired to fall in the range of $10^2$ to $5\times10^5$ ohms, preferably $10^3$ to $10^4$ ohms. It has been demonstrated, however, that when the resistive layer is formed by using a conventional electroconductivity imparting filler such as graphite or acetylene black, it is difficult to lower the surface resistance below $5\times10^5$ ohms. The surface resistance can be lowered to the order of $3\times10^5$ to $5\times10^5$ ohms by increasing the filling ratio of graphite or acetylene black. Then, the application of the resistance layer on the support layer will become difficult. Besides, the kinetic strength which the resistive layer exhibits under the forced contact of the current-passing head and the tight adhesion of the resistive layer to the support layer are too low for the resistance layer to withstand actual use.

The second problem concerns resistance to heat. It has been shown that, by the jourlean heat, the temperatures of the resistive layer and the support layer reach levels in the range of 150° to 350° C. and remain there, though for a brief duration of 20 $\mu$.sec to 20 m.sec.

As the material for the support layer, polyimide film or condenser paper is recommendable because of resistance to heat. Neither polyimide film nor condenser paper easily produces a film of small thickness in the range of 2 to 10 $\mu$m. A film of small thickness of not more than 10 $\mu$m required for transfer of a delicate intermediate gradation cannot be provided by such a material from the standpoint of thermal conductivity. Moreover, the polyimide film is too expensive to be used as a disposable material. In view of the balance of various factors such as thickness, heat resistance, and kinetic strength of the film, and price, there is no alternative but to select a biaxially oriented film of polyethylene terephthalate (PET) as the material for the support layer.

When the PET film is used as the support layer, however, there ensues the major problem that the PET film is melted along the path of the needle of the recording head and is consequently caused to sustain bores if the resistive layer offers poor resistance to heat. As the result, the image produced is seriously impaired in quality and, in an extreme case, is totally spoiled by sticking of the head needle.

Furthermore, as means of attaining tight adhesion of the resistive layer and the support film, there have heretofore been devised a method in which the PET film is activated by corona discharge and then coated with a resistive layer, and a method in which the PET film is undercoated with a thin layer of a modified polyester (0.3 to 1 μm) and then coated with a resistive layer. These methods prove unfit because the former method fails to offer ample tight adhesion and the latter entails an addition to cost.

DESCLOSURE OF THE INVENTION

A primary object of this invention is to provide an electrothermal transfer recording sheet whose resistive layer offers far smaller magnitude of resistance than the conventional countertype. Another object is to improve the heat resistance of the electrothermal transfer recording sheet.

Specifically, in the electrothermal transfer recording sheet, the electroconductive particles in the resistive layer are formed by using carbon black having a DBP oil absorption capacity of not less than 300 ml/100 g. Particularly since the resistive layer is formed by dispersing the aforementioned carbon black, with the aid of a ball mill, in a solution having the solid components for the formation of the resistive layer other than carbon black (preponderantly of resin component serving as a binder) dissolved in a solvent, applying the resultant dispersant on the support layer, and drying the applied layer of the dispersion thereby expelling the solvent, the surface resistance as low as to fall below $5\times10^5$ ohms, or even to reach a level in the range of $10^3$ to $10^4$ ohms.

In this invention, phenoxy resin is used as the binder for the resistive layer for the purpose of improving the resistance to heat of the electrothermal transfer recording sheet. Particularly by causing this resin to be cross-linked with at least one cross-linking agent selected from among polyisocyanate, melamine-formaldehyde, phenol-formaldehyde, urea-formaldehyde, etc., the resistive layer is enabled to acquire an ability to resist a temperature of not less than 300° C. for a brief period. Moreover, since the phenoxy resin is capable of sufficiently dispersing carbon particles, the resistive layer is allowed to exhibit uniform resistance.

Specifically, the mixing ratio of the components for the resistive layer is required to as follows.

(1) 5 to 35% by weight of carbon black having a DBP oil absorption capacity of not less than 300 ml/100 g to be used as electroconductive disperant particles, (2) 20 to 60% by weight of phenoxy resin represented by the formula:

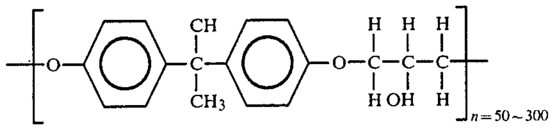

(wherein n denotes degree of polymerization), and (3) 5 to 25% by weight of at least one cross-linking agent for the aforementioned phenoxy resin, to be selected from among polyisocyanate, melamine-formaldehyde, and urea-formaldehyde.

In this invention, the DBP oil absorption capacity of carbon black is determined by allowing a sample of carbon black to absorp dibutyl phthalate (DBP) and measuring the amount of DBP absorbed with an absorptometer in accordance with the Method A for Determination of Oil Absorption defined by JIS K6221. In the present invention, the proportion of carbon black is in the range of 5 to 35% by weight. Thus by using carbon black in a small proportion as compared with the conventional resistive layer, the resistive layer is allowed to acquire notably low resistance and enhanced tight adhesiveness and the electrothermal transfer recording sheet is enabled to enjoy lowered power consumption and improved operational stability.

Figure 1:
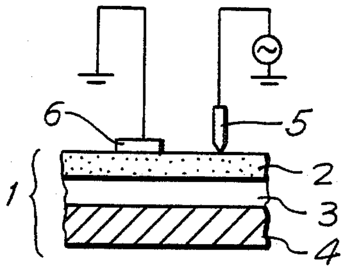
FIG. 1 is a diagram of operating principle illustrating the construction of a electrothermal transfer recording sheet and the manner of passage of electric current therethrough by means of a recording head.

In the diagrams, 1 denotes an electrothermal transfer recording sheet, 2 a resistive layer, 3 a support layer, 4 (41 through 44) an ink layer, 5 a recording electrode, and 6 a return electrode.

DESCRIPTION OF PREFERRED EMBODIMENT OF THE INVENTION

During the experiment conducted for the perfection of this invention, existence of close correlation was confirmed between the DBP oil absorption capacity of carbon type particles and the magnitude of surface resistance of the resistive layer applied by the solution method. If the DBP oil absorption capacity is less than 300 ml/100 g, it is difficult to lower the magnitude of surface resistance to or below $5\times10^5$ ohms. It has been ascertained to the inventors that when the carbon type particles to be used possess a DBP oil absorption capacity of not less than 300 ml/100 g, the magnitude of surface resistance exhibited by the resistive layer can be attained in the range of $10^2$ to $5\times10^5$ ohms for some explicable reason.

Acetylene black of satisfactory electroconductivity possesses a DBP oil absorption capacity in the capacity of 210 to 280 ml/100 g. As carbon particles possessing a DBP oil absorption capacity exceeding 300 ml/100 g, a product of Akzo Chemie of the Netherlands, marketed under trademark designation of Ketschen Black can be cited. This products exhibits a DBP oil absorption capacity in the range of 300 to 450 ml/100 g. None of the existing carbon particles exhibit a DBP oil absorption capacity exceeding 450 ml/100 g. The ordinary rubber grade carbon black has a DBP oil absorption capacity in the range of 50 to 150 ml/100 g. When this carbon black is used in the resistive layer, the magnitude of resistance exhibited by the resistive layer is on the order of $10^6$ to $10^7$ ohms. Thus, this carbon black cannot be used for the purpose of this invention.

To attain the object of this invention, it is most desirable to adopt Ketschen Black carbon particles. It is essential that the dispersion of Ketschen Black in the binder resin should be carried out in a solution. Ketschen Black has a carboxyl group content of about 0.5 meq/g and a total acidity (excepting carboxyl group) of about 0.3 meq/g. Although it possesses a polar group, it is substantially oleophilic so that in a water-toluene binary phase, it is suspended in the toluene phase. In a solution of the binder resin in an oleophilic organic solvent, therefore, Ketschen Black can be uniformly dispersed by treating Ketschen Black and the solution in a ball mill for about 24 to 48 hours and then subjecting the resultant mixture to a treatment with an attriter for 6 to 12 hours. In the electrothermal transfer system, the uniformity of dispersion of the particles heavily affects the image quality of a produced print. In a compound having Ketschen Black kneaded in the binder resin of the form of bulk, no uniform dispersion can be obtained. Consequently, the magnitude of surface resistance exhibited by the resistive layer falls on the order of $10^6$ to $10^7$ ohms.

In the resistive layer, the proportion of carbon black to the total solid components is in the range of 5 to 35% by weight, preferably 10 to 25% by weight. This invention is characterized by the fact that when the carbon black used therein has a DBP oil absorption capacity of not less than 300 ml/100 g, a sufficiently low magnitude of surface resistance can be obtained despite a notably small carbon black content. If the carbon black content is less than 5% by weight, the magnitude of surface resistance cannot be lowered to or below $5\times10^5$ ohms. If the carbon black content exceeds 35% by weight, the resistive layer is brittle and liable to peel off the support layer, although the magnitude of surface resistance may be lowered to or below about $10^2$ ohms. Thus, the carbon black content is to be suitably selected within the range of 5 to 35% by weight in accordance with a predetermined magnitude of resistance.

The phenoxy resin to be used in this invention for the purpose of improving the resistance to heat of the resistive layer possesses a chemical structure of the following formula.

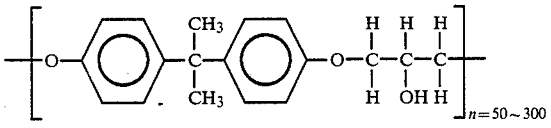

The degree of polymerization, n, of this phenoxy resin is in the range of 50 to 300, preferably 80 to 200. If the degree of polymerization is smaller than 50, the phenoxy resin exhibits satisfactory dispersibility to carbon particles but the kinetic strength between the resistive layer and the applied coat is too inferior to withstand actual use. If the degree of polymerization exceeds 300, despite the resistive layer's high resistance to heat and high kinetic strength, the phenoxy resin shows so inferior dispersibility to carbon particles that thermally transferred image lacks uniformity of density and fails to show sufficient intermediate gradation.

The phenoxy resin possesses one hydroxyl group for each of the repeating units thereof. The high dispersibility exhibited by the phenoxy resin to carbon particles may be logically accounted for by a supposition that the phenoxy resin forms a chemical bond of some kind or Van der Waals force with the carboxyl group on the surface of carbon particles.

The phenoxy resin, in the present invention, is cross-linked by utilizing the hydroxyl group of the phenoxy resin and using at least one cross-linking agent selected from among polyisocyanate, melamine-formaldehyde, phenol-formaldehyde, and urea-formaldehyde. If the phenoxy resin is used in its independent form lacking the cross-linked structure produced by the use of a cross-linking agent described above, the resistive layer's resistance to heat does not rise to or above 300° C. Concrete examples of the polyisocyanate include 2,4-tolylene diisocyanate, 2,6-tolylene diisocyanate, diphenylmethane-4,4'-diisocyanate, the reaction product of 3 mols of 2,4-tolylene diisocyanate with 1 mol of trimethylol propane, 3,3'-bitolylene-3,4'-diisocyanate, 3,3'-dimethyldiphenyl-methane-4,4'-diisocyanate, and 2,4-tolylene diisocyanate dimer (uretidine dion). The reaction product of 2,4-tolylene diisocyanate with trimethylol propane proves particularly desirable.

The application of the resistive layer on the support layer is accomplished particularly advantageously by thoroughly dispersing carbon black in conjunction with the phenoxy resin and polyurethane in an organic solvent and, immediately before the application, stirring the resultant dispersion with the cross-linking agent added thereto. To ensure that the cross-linking reaction is carried out thoroughly and the ability to resist heat is improved sufficiently, the applied layer of the dispersion after expulsion of the solvent is left curing at 40° to 60° C. for 24 to 48 hours where polyisocyanate is used or at 120° C. for 30 minutes where melamine-, phenol-, or ureaformaldehyde is used.

Although the phenoxy resin exhibits outstanding resistance to heat and satisfactory dispersibility to carbon particles, it shows tight adhesiveness in the medium degree to the PET film. In the peel test using an adhesive tape containing cross cuts inserted at intervals of 1 mm, 70% of the squares are separated. So, a study was made to search for a binder capable of improving the tight adhesiveness of the phenoxy resin. In this case, the substance used for the improvement of the tight adhesiveness is expected to fulfil the requirements (1) that it should possess high compatibility with the phenoxy resin, (2) that it should exhibit high dispersibility to carbon particles, and (3) that it should show fairly high resistance to heat. A study conducted on epoxy resin, phenol resin, modified polyester, PVB, PBC1/VAc, and polyurethane has revealed that polyurethane, when added in a controlled amount, test fulfils the aforementioned requirements. Polyurethane not only enhances the tight adhesiveness but also proves effective in conferring softness, the particular attribute absent from the applied cross-linked film of the phenoxy resin.

As the polyurethane to be used in this invention for the improvement of the tight adhesiveness of the resistive layer to the PET film, what is commercially available as a polyurethane adhesive agent can be used. Examples include at least bifunctional polyester, high molecular reaction products of polyester with TDI, MDI, etc., and prepolymers produced by the reaction of diisocyanate with polyfunctional active hydrogen compounds.

The ratio of phenoxy resin-polyurethane contents is desired to fall in the range of 3/7 to 7/3, preferably 4/6 to 6/4. If Cp is less than 20%, the resistance to heat fails to reach 300° C. If Cp is more than 60%, no sufficient tight adhesiveness is obtained. The content of the cross-linking agent, Cc, is in the range of 5 to 25% by weight. If Cc is less than 5% by weight, the resistance to heat is inferior. If Cc is more than 25, the resistance to heat is excessively high and the tight adhesiveness is not sufficient. The content of polyurethane, Cu, is in the range of 10 to 50%. If Cu is less than 10%, the tight adhesiveness is substantially the same as when no Cu is present at all. If Cu is more than 50%, the tight adhesiveness is improved extremely and the resistance to heat falls short of reaching 300° C.

The total amount of the carbon black (Ck), the phenoxy resin (Cp), the cross-linking agent (Cc), and the polyurethane (Cu) is in the range of 85 to 100% by weight, based on the solid components in the resistive layer, thus:

$$\Sigma = Ck + Cp + Cc + Cu = 85 \text{ to } 100\% \text{ by weight}$$

From the formula, it is noted that any material other than the four components mentioned above may be incorporated in an amount of not more than 15% by weight. Examples of the additive allowed to be incorporated are softening agent, friction resisting agent, antistatic agent, lubricant, slidant, binder resin, and electroconductive particles. The vinyl chloride/vinyl acetate copolymer, for example, may be incorporated in an amount of not more than 15% by weight in the solid components, because this copolymer enhances the dispersibility of carbon particles, though with a sacrifice of the resistance to heat. If the total amount of the four components is less than 85%, the electrothermal transfer recording sheet aimed at by the present invention cannot be obtained because some of the important attributes, i.e. dispersibility, magnitude of resistance, resistance to heat, and tight adhesiveness is seriously degraded.

The electrothermal transfer recording sheet which comprises a resistive layer, a support layer, and an ink layer so selected respectively in due consideration of the various requirements mentioned above as to effect desired recording by passing electric current through the resistive layer thereby causing the resistive layer to generate heat and enabling the ink layer to be thermally transferred onto a blank sheet of paper for recording has the following typical construction, for example.

The resistive layer contains at least the following solid components (1)-(4), (1) 5 to 35% by weight of carbon black, Ck, as electroconductive dispersant particles having a DBP oil absorption capacity of not less than 300 ml/100 g, (2) 20 to 60% by weight of phenoxy resin of the following formula, Cp:

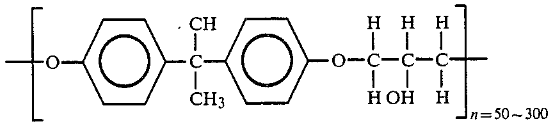

(wherein n denotes degree of polymerization)

(3) 5 to 25% by weight of at least one cross-linking agent, Cc, for the aforementioned phenoxy resin, selected from among polyisocyanate, melamine-formaldehyde, phenol-formaldehyde, and urea-formaldehyde, and (4) 10 to 50% by weight of polyurethane, Cu, and the total amount of the solid components of (1)-(4) indicated above fulfils the following condition, (5) $Ck + Cp + Cc + Cu = 85$ to 100% by weight, the support layer comprises, (6) a biaxially oriented film of polyethylene terephthalate having a thickness in the range of 2 to 10 $\mu$m, and the resistive layer fulfils the following requirement (7), (7) that the magnitude of surface resistance should fall in the range of $10^2$ to $5 \times 10^5$ ohms.

Thus, the electrothermal transfer recording sheet of the present inveniton must fulfil all the requirements (1)-(7) mentioned above.

The PET film for the support layer has a thickness in the range of 2 to 10 $\mu$m, preferably 4 to 7 $\mu$m. The thickness of this film is desired to be as thin as possible because the efficiency of thermal conduction increases, the electric power to be applied decreases, and the print produced gains in clarity and sharpness in proportion as the thickness decreases. Any decrease of the thickness of this film below the lower limit 2 $\mu$m proves impracticable because the film of such small thickness gather wrinkles during the superposition of component layers and during the course of thermal transfer. If the thickness of the film exceeds 10 $\mu$m, however, the efficiency of thermal conduction is degraded, the electric power to be applied is increased, the diameter of dots of print is increased by diffusion of heat in the lateral direction, and the resolvability of print is impaired.

The composition of the resistive layer is desired to be prepared by dissolving the phenoxy resin and the polyurethane either separately or simultaneously in an organic solvent, dispersing the carbon black particles in the resultant solution with the aid of a ball mill or an attriter, and stirring the carbon-black-dispersed solution and the cross-linking agent added thereto immediately before the support layer is coated with the composition. As the applicator head for the coating machine, one tool selected from among reverse roll, gravure roll, gravure offset roll, doctor blade, and wiper can be used. The solids concentration of the composition prepared for application is in the range of 10 to 40% by weight, preferably 20 to 30% by weight. After the application, the resultant sheet is dried in a drier furnace to expel the solvent. The cross-linking reaction of the phenoxy resin by the use of the cross-linking agent (possibly in conjunction with polyurethane depending on the kind of polyurethane) proceeds to some extent while the sheet is being dried within the drier furnace. For the cross-linking reaction to be carried out fully, the sheet is desired to be treated under the aforementioned conditions.

The ink layer (indicated by 4 in FIG. 1) is applied on the support layer 3 on the opposite side of the resistive layer 2 by the hot melt method or the solution method. The ink layer is desired to be composed of about 60% by weight of wax selected from among paraffin wax, modified wax, and carnauba wax, 20% by weight of coloring matter, pigment, or dye, and 20%, by weight of resin. The ink composition containing a yellow, cyan, magenta, or black pigment or dye can be applied in one color as indicated by 4 in the diagram of FIG. 1 or in parallel strips of different colors as indicated by 4 (41-44) in the diagram of FIG. 2.

The resistive layer of the present invention described in detail above has a magnitude of surface resistance in the range of $10^2$ to $5\times10^5$ ohms, preferably $10^3$ to $10^4$ ohms. The reduction of the magnitude of resistance to this low level is ascribable to the fact that the specific carbon black having a DBP oil absorption capacity of not less than 300 ml/100 g is dispersed in a solution of the binder resin and the support layer is coated with the carbon-black-dispersed solution of the binder resin.

The resistive layer of the present invention is capable of resisting heat to a temperature of 300° to 400° C. for a brief period and, even on exposure to electric power applied for producing the highest density (optical density, OD,=1.5), can avoid the problem of the PET film layer melting and sustaining holes therein. This high resistance to heat is preponderantly ascribable to the effect derived by incorporating the specific phenoxy resin in a prescribed amount and causing the phenoxy resin to acquire a cross-linked structure by the use of the cross-linking agent. The tight adhesiveness between the resistive layer and the support layer in this invention is practically complete. In the peel test using an adhesive tape containing cross cuts inserted at intervals of 1 mm, the number of squares of adhesive tape separated was less than 15%. This satisfactory tight adhesiveness is ascribable, in a specific amount.

The electrothermal transfer recording sheet according with the present invention brings about the following merits.

(1) Since the magnitude of surface resistance is allowed to fall in the range of $10^3$ to $10^4$ ohms, the voltage applied can be lowered to the level of 15 to 50 V and the price of the IC to be used for driving the recording head can be proportionately lowered. Consequently, the expense for the power source can be decreased.

(2) Since the voltage applied is lowered, the amount of electric discharge can be decreased and the service life of the recording head can be conspicuously improved.

(3) Since the electric discharge of the recording head is decreased, the amount of scrapings of the resistive layer suffered to adhere to the head can be notably decreased and the ease of maintenance can be enhanced.

(4) Since the carbon black is dispersed uniformly, the quality of print to be obtained can be improved and delicate intermediate gradation can be printed with high clarity.

(5) Since the resistance to heat is improved, the disadvantage that the PET film sustains holes, the recording head suffers from obstruction by the stick, and the printed image is defiled by bores can be eliminated.

(6) Since the tight adhesiveness is improved, separation of dots of the resistive layer and adhesion of scrapings of the resistive layer to the recording head during the thermal transfer are no longer suffered.

Now, the present invention will be described below with reference to working examples. Naturally, this invention is not limited by these working examples.

The DBP oil absorption capacity, the magnitude of surface resistance, the resistance to heat, and the tight adhesion as defined by this invention are determined by the following methods.

(1) DBP oil absorption capacity

Method A for determination of absorbed oil in accordance with JIS K-6221.

(2) Magnitude of surface resistance

On a base of a smooth flat surface, a given sheet is placed with the current-passing resistive layer falling on the upper side, a pair of gold-plated brass electrodes each having a width of 5 mm, a length of 35 mm and a weight of 350 g are placed parallelly to each other on the resistive layer. With the electrodes separated parallelly by a distance of 35 mm, the magnitude of resistance is measured with a potentiometer. This determination is carried out in an atmosphere of 25° C. of temperature and 65% of relative humidity.

(3) Resistance to heat

Preparatory to the determination of this property, a calibration curve between the amount of electric power found from the voltage and the amperage applied to a recording head and the temperature measured with an infrared thermometer is obtained of a standard resistive layer. A given resistive layer is exposed to gradually rising electric power of the head and the temperature at which the support layer of PET film is melted and bored by the joulean heat as observed under a transmission optical microscope is found. The resistance to heat is rated by the temperature so reported as the criterion for the evaluation. When the PET film sustains no bore under the full density of thermal transfer image in black (optical density, OD,=1.4 to 1.5), the sheet is reported as possessing ample resistance to heat.

(4) Tight adhesiveness

On a steel board in a cross-cut tester (made by Toyo Precision Machinery), a given PET film supporting thereon a resistive layer is placed and the cross cutter of the machine is lowered onto the PET film with a load not enough for the cutter to plunge into the PET film to inflict on the resistive layer 10 longitudinal and 10 lateral cross cuts spaced by intervals of 1 mm. An adhesive tape is applied to the cross-cut resistance layer and ripped. The number of squares of the cross-cut resistive layer which remain sticking to the PET film is reported as the value of tight adhesiveness (%).

EXAMPLES 1-2 AND COMPARATIVE EXPERIMENTS 1-5

Carbon black of a varying grade indicated in Table 1 was dispersed in binder resin indicated below. A PET film as a support layer is coated with the carbon-black-dispersed solution of the binder resin. The sheet consequently obtained was dried to expel the solvent and then subjected to a cross-linking reaction. The produced sheet was tested for magnitude of surface resistance.

(1) Conditions of dispersion

Carbon type particles: 20 parts (by weight)

Phenoxy resin (product of UCC, marketed under trademark designation of PKHH): 35 parts Polyurethane (product of Nippon Polyurethane, marketed under trademark designation of N-2304): 30 parts Polyisocyanate (product of Nippon Polyurethane, marketed under trademark designation of Coronate L): 15 parts MEK toluene (=1/1): 400 parts Dispersion: 24 hours in a ball mill (2) Application Support layer: Biaxially oriented film of PET (8 μm)

Coating machine: Three reverse roll coater, coating speed 20 m/sec, thickness of applied coat about 4 μm (dry thickness)

Drying: A dry furnace 4 m in length, using hot air 150° C.

(3) Reaction: 10 minutes at 80° C. and 24 hours at 45° C.

(4) Results:

Table 1 shows the relation between the DBP oil absorption capacity carbon particles of a varying grade and the magnitude of surface resistance.

TABLE 1

| Example or Comparative Experiment | Kind of carbon particles | DBP oil absorption capacity (ml/100 g) | Magnitude of surface resistance (ohm) |
|---|---|---|---|
| Example 1 | Ketschen black (trademark designation) | 360 | $1.2 \times 10^3$ |
| Example 2 | Ketschen black (trademark designation) | 320 | $8.0 \times 10^3$ |
| Comparative Experiment 1 | Acetylene black | 280 | $9.7 \times 10^5$ |
| Experiment 2 | Acetylene black | 240 | $1.2 \times 10^6$ |
| Experiment 3 | Furnace black (for color) | 125 | $5.4 \times 10^6$ |
| Experiment 4 | Furnace black (for color) | 80 | $8.1 \times 10^6$ |
| Experiment 5 | Furnace black (for color) | 45 | $1.9 \times 10^7$ |

It is noted from Table 1 that close correlation exists between the magnitude of surface resistance and the DBP absorption capacity and that the DBP absorption capacity must exceed 300 ml/100 g in order for the magnitude of resistance to fall in the range of $10^2$ to $5\times10^6$ ohms as aimed at by the present invention. In the case of carbon particles having a DBP absorption capacity of not more than 300 ml/100 g (Comparative Experiments 1-5), the magnitude of surface resistance cannot be lowered to or below $5\times10^5$ ohms when the amount of carbon incorporated is on the order of 20% by weight as involved in the present experiment.

EXAMPLES 3-5 AND COMPARATIVE EXPERIMENTS 6-7

Phenoxy resin of varying grade (degree of polymerization), Ketschen Black (DBP absorption capacity 345 ml/100 g), polyisocyanate, and polyurethane were dispersed in a solvent (MEK/toluene=1/1, to solids concentration of 25%). Then, by using the same dispersion conditions (solid component composition), solution applying conditions, and cross-linking reaction conditions as used in Examples 1-2, there was produced a resistive layer. The produced sheet was tested for magnitude of surface resistance, resistance to heat (temperature of bore formation in PET film and observation under an optical microscope), and tight adhesiveness. The results are shown in Table 2.

TABLE 2

| | Degree of polymerization of phenoxy resin (n) | Magnitude of surface resistive (ohm) | Resistance to heat °C. | Resistance to heat Bore | Tight adhesiveness (%) | Remarks |
|---|---|---|---|---|---|---|
| Comparative Experiment 6 | 43 | $1.4 \times 10^3$ | 276 | x | 100 | |
| Example 3 | 60 | $3.2 \times 10^3$ | 305 | | 100 | |
| Example 4 | 105 | $5.4 \times 10^3$ | 345 | | 100 | |
| Example 5 | 275 | $8.2 \times 10^4$ | 365 | | 96 | |
| Comparative Experiment 7 | 330 | $2.5 \times 10^5$ | 352 | | 84 | Heavy dispersion of resistance |

In Comparative Experiment 6, the PET film of the support layer sustained bores. In Comparative Experiment 7, since no dispersion could be obtained at a solids concentration of 25% by weight, it was lowered to 15% to permit dispersion and application. However, the magnitude of resistance was dispersed so heavily that the resistive layer could not withstand the treatment for printing. The tight adhesiveness was rather poor. In Examples 3-5, the magnitude of resistance, the resistance to heat, and the tight adhesiveness were all satisfactory. The degrees of polymerization proved satisfactory in the range of 50 to 300.

EXAMPLES 6-16 AND COMPARATIVE EXPERIMENTS 8-15

Ketschen Black (DBP oil absorption capacity of 345 ml/100 g), phenoxy resin, polyisocyanate, and polyurethane were dispersed in varying ratios indicated in Table 3 in a solvent (MEK/toluene=1/1, to a solids concentration of 25% by weight).

TABLE 3

| | Composition of solid components in resistive layer: Ketschen black (wt %) | Phenoxy resin (wt %) | Polyisocyanate (wt %) | Polyurethane (wt %) | Properties of resistive layer: Magnitude of surface resistance (ohm) | Resistance to heat °C. | Resistance to heat Bore | Tight adhesiveness (%) | Remark |
|---|---|---|---|---|---|---|---|---|---|
| Comparative Experiment 8 | 3 | 42 | 13 | 42 | $1.2 \times 10^6$ | 355 | | 100 | |
| Example 6 | 7 | 40 | 13 | 40 | $4.2 \times 10^5$ | 352 | | 100 | |
| Example 7 | 15 | 37 | 11 | 37 | $6.5 \times 10^3$ | 340 | | 100 | |
| Example 8 | 30 | 30 | 10 | 30 | $3.7 \times 10^2$ | 336 | | 95 | |
| Comparative Experiment 9 | 43 | 26 | 8 | 26 | $1.5 \times 10^2$ | 282 | x | 93 | Heavy unevenness of application and heavy dispersion of resistance |
| Comparative Experiment 10 | 15 | 15 | 3 | 67 | $3.4 \times 10^4$ | 275 | x | 100 | |
| Example 9 | 15 | 25 | 5 | 55 | $2.2 \times 10^4$ | 300 | | 100 | |
| Example 10 | 15 | 35 | 7 | 43 | $7.3 \times 10^3$ | 328 | | 100 | |
| Example 11 | 15 | 50 | 10 | 25 | $6.5 \times 10^3$ | 353 | | 95 | |
| Comparative Experiment 11 | 15 | 65 | 13 | 7 | $6.7 \times 10^3$ | 358 | | 30 | Heavy unevenness of application |

TABLE 3-continued

| | Composition of solid components in resistive layer | | | | Properties of resistive layer | | | | |
|---|---|---|---|---|---|---|---|---|---|
| | Ketschen black (wt %) | Phenoxy resin (wt %) | Polyisocyanate (wt %) | Polyurethane (wt %) | Magnitude of surface resistance (ohm) | Resistance to heat °C. | Resistance to heat Bore | Tight adhesiveness (%) | Remark |
| Comparative Experiment 12 | 15 | 41 | 3 | 41 | $2.5 \times 10^4$ | 282 | x | 100 | |
| Example 12 | 15 | 39 | 7 | 39 | $9.7 \times 10^4$ | 308 | x | 98 | |
| Example 13 | 15 | 35 | 15 | 35 | $8.3 \times 10^3$ | 343 | | 100 | |
| Comparative Experiment 13 | 15 | 28 | 29 | 28 | $9.3 \times 10^5$ | 304 | | 90 | Heavy unevenness of application |
| Comparative Experiment 14 | 15 | 70 | 10 | 5 | $4.8 \times 10^3$ | 365 | | 27 | |
| Example 14 | 15 | 61 | 9 | 15 | $5.6 \times 10^3$ | 360 | | 88 | |
| Example 15 | 15 | 48 | 7 | 30 | $7.3 \times 10^3$ | 352 | | 92 | |
| Example 16 | 15 | 35 | 5 | 45 | $7.5 \times 10^3$ | 334 | | 100 | |
| Comparative Experiment 15 | 15 | 22 | 3 | 60 | $1.8 \times 10^4$ | 287 | x | 100 | |

Then, by using the same dispersion conditions solution applying conditions, and cross-linking reaction conditions are used in Examples 1-2, there was produced a resistive layer. The produced sheet was tested for magnitude of surface resistance, resistance to heat (temperature of bore formation in PET film and observation under an optical microscope), and tight adhesiveness. The results are shown in Table 3.

In Comparative Experiment 8 in which the carbon black content was small, the magnitude of resistance was not lowered to or below $5 \times 10^5$ ohms. In Comparative Experiment 9 in which the carbon black content was as large as 43%, the unevenness of application aggravated and the magnitude of resistance was dispersed, and the PET film sustained bores. In Comparative Experiment 10 in which the phenoxy resin content was as small as about 15%, the PET film sustained bores. In Comparative Experiment 11 in which the phenoxy resin content was as large as about 65%, the unevenness of application was aggravated and the tight adhesiveness was seriously degraded. In Comparative Experiment 12 in which the cross-linking agent (polyisocyanate) content was only about 3%, the PET film sustained bores and the resistive layer showed no resistance to heat. In Comparative Experiment 13 in which the cross-linking agent content was as large as about 30%, the unevenness of application was aggravated and the magnitude of resistance increased past $5 \times 10^5$ ohms and the resistance to heat tended to decline. In Comparative Experiment 14 in which the polyurethane content was extremely small falling on the order of 5% or so, the tight adhesiveness was notably low. In Comparative Experiment 15 in which the polyurethane content was as large as about 60%, the phenoxy resin content was proportionately low and the resistance to heat was low and the PET film sustained bores.

In Examples 6-16, the magnitude of surface resistance, resistance to heat, and tight adhesiveness were invariably satisfactory and the resistive layers fully withstood actual use.

EXAMPLE 17

Figure 2:
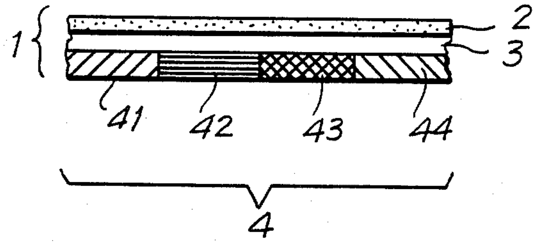
FIG. 2 is a cross section illustrating a typical construction of an electrothermal transfer recording sheet as one embodiment of the present invention.

A support layer was coated with a resistive layer by following the procedure of Example 7 and, on the side of the support layer opposite the resistive layer, ink layers of yellow, magenta, cyan, and black colors arranged as shown in FIG. 2 are repetitively connected side by side in the longitudinal direction of sheet by the hot melt method.

(1) Composition of ink layer
- Pigment: 20 parts by weight
- Paraffin wax: 20 parts by weight
- Oxide wax: 40 parts by weight
- Polyethylene/vinyl acetate copolymer: 20 parts by weight
- Stearic acid: 3 parts by weight The aforementioned components were pre-dispersed with a kneader and then thoroughly dispersed with a three-roll mill.

(2) Application of ink layer
- Coating machine: Four hot melt gravure rolls (120° C.) and a smoothing bar nip (120° C.)
- Coating speed: 20 meters/min.

EXAMPLE 18

On an electrothermal transfer recording sheet obtained by following the procedure of Example 17, a recording head possessed of a recording electrode 5 and a return electrode 6 as illustrated with a model in FIG. 1 was operated to effect color print on a plain sheet of paper of the size of A4.

(1) Recording head
- Dot pitch: Six dots per mm
- Line pitch: Six dots per mm
- Diameter of head needle: 60 μm (2) Driving
- Voltage applied: 30 V
- Pulse width modulation: Gradation between 50 μ.sec to 1.6 m.sec (3) Results of full color print A color silver salt photograph as an original was subjected to color separation with a color scanner, converted into colors of 32 gradations, subjected to $\gamma$ modulation, and subsequently put to full-color printing.

The print obtained by using the electrothermal transfer recording sheet according with the present invention produced a color image extremely approximating the original image (original) and abounding with gradation.

Since the magnitude of resistance exhibited by the resistive layer was only on the low order of $10^3$ ohms the voltage applied for driving during the course of printing was only 30 V.

We claim:

1. An electrothermal transfer recording sheet, comprising:

a support layer;

a current-passing resistance layer integrally bound to the support layer on one surface thereof, the resistance layer formed from carbon black and a resin binder with the carbon black having a DBP oil absorption capacity of at least 300 m/100 g; and an ink layer integrally bound to the opposed surface of the support layer.

2. The electrothermal transfer recording sheet of claim 1, wherein the ink layer includes about 60 percent by weight wax, 20 percent by weight coloring matter and 20 percent by weight resin.

3. The electrothermal transfer recording sheet of claim 2, wherein the coloring matter is disposed on the support layer in parallel strips of different colors.

4. The electrothermal transfer recording sheet of claim 1, wherein the support layer is a synthetic resin film.

5. The electrothermal transfer recording sheet of claim 4, wherein the synthetic resin is polyethylene terephthalate.

6. The electrothermal transfer recording sheet of claim 5, wherein the polyethylene terephthalate is a bi-axially oriented film.

7. The electrothermal transfer recording sheet of claim 6, wherein the bi-axially oriented film has a thickness between about 2 to 10 μm.

8. The electrothermal transfer recording sheet of claim 6, wherein the bi-axially oriented film has a thickness between about 4 to 7 μm.

9. The electrothermal transfer recording sheet of claim 1, wherein the current-passing resistance layer includes between about 5 to 35 percent by weight carbon black, 20 to 60 percent by weight phenoxy resin and 5 to 25 percent by weight of at least one cross-linking agent.

10. The electrothermal transfer recording sheet of claim 9, wherein the phenoxy resin has the following general formula:

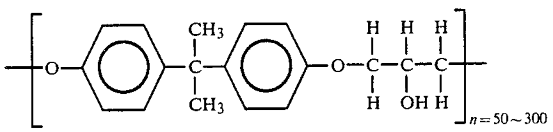

wherein n denotes the degree of polymerization and the cross-linking agent is selected from the group consisting of polyisocyanate, melamine-formaldehyde, phenol-formaldehyde and urea-formaldehyde.

11. The electrothermal transfer recording sheet of claim 9, further including a sufficient amount of polyurethane to act as an adhesive between the phenoxy resin and substrate.

12. The electrothermal transfer recording sheet of claim 11, wherein the weight ratio of phenoxy resin to polyurethane is between about 3:7 to 7:3.

13. The electrothermal transfer recording sheet of claim 11, wherein the weight ratio of phenoxy resin to polyurethane is between about 4:6 to 6:4.

14. The electrothermal transfer recording sheet of claim 11, wherein the polyurethane is present between about 10 to 50 weight percent of the resistance layer.

15. The electrothermal transfer recording sheet of claim 11, wherein the current-passing resistance layer includes between about 85 to 100 by weight of the carbon black, phenoxy resin, cross-linking agent and polyurethane.

* * * * *